US012300053B2

(12) United States Patent
Manda et al.

(10) Patent No.: US 12,300,053 B2
(45) Date of Patent: May 13, 2025

(54) MISSING PROPERTY ACCESS TOOL DETECTION IN LOCK BOX

(71) Applicant: Carrier Corporation, Palm Beach Gardens, FL (US)

(72) Inventors: Ramya Manda, Telangana (IN); Prudhvi Krishna Seethala, Telangana (IN); Hariprasad Kasavajjala, Telangana (IN); Baby Shalini Bandari, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 141 days.

(21) Appl. No.: 18/165,369

(22) Filed: Feb. 7, 2023

(65) Prior Publication Data

US 2023/0252878 A1 Aug. 10, 2023

Related U.S. Application Data

(60) Provisional application No. 63/307,843, filed on Feb. 8, 2022.

(51) Int. Cl.
*G08B 21/18* (2006.01)
*G07C 9/00* (2020.01)
*G08B 13/14* (2006.01)

(52) U.S. Cl.
CPC ..... *G07C 9/00896* (2013.01); *G07C 9/00571* (2013.01); *G08B 13/1472* (2013.01); *G07C 2009/00936* (2013.01); *G07C 2209/63* (2013.01)

(58) Field of Classification Search
CPC ...... G07C 9/00896; G07C 2009/00936; G07C 9/00571; G07C 2209/63; G07C 9/00309; G07C 9/27; G08B 13/1472
See application file for complete search history.

(56) References Cited

U.S. PATENT DOCUMENTS 7,606,558 B2 10/2009 Despain et al.
7,999,656 B2 8/2011 Fisher
8,035,480 B2 10/2011 Woodard et al.
9,704,319 B2 7/2017 Desinor, Jr.
10,017,960 B2 7/2018 Kristensen
10,072,454 B1 9/2018 Roosli et al.
10,745,943 B1 8/2020 Jonak et al.
(Continued)

FOREIGN PATENT DOCUMENTS

WO 9303246 A1 2/1993

*Primary Examiner* — An T Nguyen
(74) *Attorney, Agent, or Firm* — CANTOR COLBURN LLP

(57) ABSTRACT

A method of monitoring a storage area within a lock box including: detecting, using at least one of: a load cell sensor or an object shape detection sensor, a physical property of a property access tool within the storage area prior to a showing of a property, the physical property of the property access tool including at least one of a weight of the property access tool or a shape of the property access tool; saving the physical property of the property access tool; detecting an end of the showing of the property; detecting, after the end of the showing, that the property access tool is not present in the storage area; and activating, using a controller, an alert in response to detecting that the property access tool is not present in the storage area.

19 Claims, 7 Drawing Sheets

(56) References Cited

U.S. PATENT DOCUMENTS

| | | | | |
|---|---|---|---|---|
| 10,796,519 | B2 | 10/2020 | Santhosh et al. | |
| 10,891,814 | B2 | 1/2021 | Briskey | |
| 11,162,277 | B2 | 11/2021 | Spath | |
| 2007/0090921 | A1 * | 4/2007 | Fisher | G07C 9/00896 340/5.5 |
| 2009/0153291 | A1 | 6/2009 | Larson et al. | |
| 2016/0337856 | A1 * | 11/2016 | Chung | G07C 9/32 |
| 2020/0208434 | A1 | 7/2020 | Hatano | |
| 2021/0047864 | A1 | 2/2021 | Kuenzi et al. | |
| 2021/0056789 | A1 | 2/2021 | Amuduri et al. | |
| 2022/0114848 | A1 * | 4/2022 | Shaikh | G07C 9/28 |
| 2022/0406164 | A1 * | 12/2022 | Sripathy | G08B 21/24 |

* cited by examiner

MISSING PROPERTY ACCESS TOOL DETECTION IN LOCK BOX

CROSS-REFERENCE TO RELATED APPLICATIONS

This application claims the benefit of U.S. Provisional Application No. 63/307,843 filed Feb. 8, 2022, all of which are incorporated herein by reference in their entirety.

BACKGROUND

The embodiments herein generally relate to lock boxes and more specifically, a method and apparatus to assess whether a property access tool is present in the lock box.

Lock boxes are typically used to a provide a secured storage area for a property access tool (e.g., key, the access card, or other access aid) at a location close to a locked property (e.g., at a front door to a residential home) accessible by the property access tool. In this way, an authorized user can unlock the secured storage area, obtain the property access tool and then use the property access tool to unlock the locked property. Although the locked property may be a residential home, it is envisioned that the locked property may be any space that is locked while unattended by a traditional lock that requires a property access tool. For example, the locked property may be a commercial or industrial site, or other type of property.

The lock box is typically attached to a door handle or to another stationary object near the traditional lock. The lock box is typically configured to require the user to demonstrate that the user is authorized to obtain access to the locked property before the secured storage area is unlocked to allow the user to obtain the property access tool. In a mechanical lock box, the user might be required to enter a correct lock combination to access the secured storage area. In an electronic lock box, the user might be required to communicate a credential to the lock box (via a physical connection to the lock box or via a wireless link to the lock box) to access the secured storage area.

BRIEF DESCRIPTION

According to one embodiment, a method of monitoring a storage area within a lock box is provided. The method including: detecting, using at least one of: a load cell sensor or an object shape detection sensor, a physical property of a property access tool within the storage area prior to a showing of a property, the physical property of the property access tool including at least one of a weight of the property access tool or a shape of the property access tool; saving the physical property of the property access tool; detecting an end of the showing of the property; detecting, after the end of the showing, that the property access tool is not present in the storage area; and activating, using a controller, an alert in response to detecting that the property access tool is not present in the storage area.

In addition to one or more of the features described above, or as an alternative, further embodiments of may include that the detecting that the property access tool is not present in the storage area is completed by detecting at least one of a weight of an object present in the storage area or a shape of the object present in the storage area, and wherein at least one of the weight of the object present in the storage area or the shape of the object present in the storage area does not match the saved physical property of the property access tool.

In addition to one or more of the features described above, or as an alternative, further embodiments of may include transmitting, using the controller, the alert to a mobile computing device.

In addition to one or more of the features described above, or as an alternative, further embodiments of may include displaying a visual notification on the mobile computing device indicating that the property access tool has not been placed in the storage area.

In addition to one or more of the features described above, or as an alternative, further embodiments of may include displaying a visual notification on the mobile computing device indicating that an incorrect property access tool has been placed in the storage area.

In addition to one or more of the features described above, or as an alternative, further embodiments of may include that the property access tool is either a key or an access card.

In addition to one or more of the features described above, or as an alternative, further embodiments of may include detecting and saving both the weight of the property access tool and the shape of the property access tool, the detecting that the property access tool is not present in the storage area is completed by detecting at least one of a weight and a shape of an object present in the storage area.

In addition to one or more of the features described above, or as an alternative, further embodiments of may include that at least one of the weight or the shape of the object present in the storage area does not match the saved physical property of the property access tool when the property access tool is not present in the storage area.

In addition to one or more of the features described above, or as an alternative, further embodiments of may include the alert is activated by the controller when the weight of the object present in the storage area does not match the saved weight of the property access tool, but the shape of the object present in the storage area matches the saved shape of the property access tool.

In addition to one or more of the features described above, or as an alternative, further embodiments of may include the alert is activated by the controller when the shape of the object present in the storage area does not match the saved shape of the property access tool, but the weight of the object present in the storage area matches the saved weight of the property access tool.

According to another embodiment a lock box is provided. The lock box including: a storage area configured to fit a property access tool therein; at least one of a load cell sensor configured to detect a weight of the property access tool within the storage area or an object shape detection sensor configured to detect a shape of the property access tool within the storage area; a controller including: a processor; and a memory including computer-executable instructions that, when executed by the processor, cause the processor to perform operations, the operations including: detecting, using at least one of: the load cell sensor or the object shape detection sensor, a physical property of a property access tool within the storage area prior to a showing of a property, the physical property of the property access tool including at least one of the weight of the property access tool or the shape of the property access tool; saving the physical property of the property access tool; detecting an end of the showing of the property; detecting, after the end of the showing, that the property access tool is not present in the storage area; and activating an alert in response to detecting that the property access tool is not present in the storage area.

In addition to one or more of the features described above, or as an alternative, further embodiments of may include that the detecting that the property access tool is not present in the storage area is completed by detecting at least one of a weight of an object present in the storage area or a shape of the object present in the storage area, and wherein at least one of the weight of the object present in the storage area or the shape of the object present in the storage area does not match the saved physical property of the property access tool.

In addition to one or more of the features described above, or as an alternative, further embodiments of may include that the operations further include: transmitting, using the controller, the alert to a mobile computing device.

In addition to one or more of the features described above, or as an alternative, further embodiments of may include that the operations further include: displaying a visual notification on the mobile computing device indicating that the property access tool has not been placed in the storage area.

In addition to one or more of the features described above, or as an alternative, further embodiments of may include that the operations further include: displaying a visual notification on the mobile computing device indicating that an incorrect property access tool has been placed in the storage area.

In addition to one or more of the features described above, or as an alternative, further embodiments of may include that the property access tool is either a key or an access card.

In addition to one or more of the features described above, or as an alternative, further embodiments of may include that the operations further include: detecting and saving both the weight of the property access tool and the shape of the property access tool, the detecting that the property access tool is not present in the storage area is completed by detecting at least one of a weight and a shape of an object present in the storage area.

In addition to one or more of the features described above, or as an alternative, further embodiments of may include that at least one of the weight or the shape of the object present in the storage area does not match the saved physical property of the property access tool when the property access tool is not present in the storage area.

In addition to one or more of the features described above, or as an alternative, further embodiments of may include that the alert is activated by the controller when the weight of the object present in the storage area does not match the saved weight of the property access tool, but the shape of the object present in the storage area matches the saved shape of the property access tool an alert is activated by the controller.

In addition to one or more of the features described above, or as an alternative, further embodiments of may include that the alert is activated by the controller when the shape of the object present in the storage area does not match the saved shape of the property access tool, but the weight of the object present in the storage area matches the saved weight of the property access tool an alert is activated by the controller.

Technical effects of embodiments of the present disclosure include detecting whether the correct property access tool has been placed in a storage area of a lock box after the completion of a real-estate showing and alerting the individual (e.g., buyer or buyer's real-estate agent) if the correct property access tool was not returned to the storage area of the lock box.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Conventional lock boxes typically include a storage area sized to fit a key or an access card, however there no way to confirm whether or not the key and/or access card (which may be referred to herein as a property access tool) has been returned to the storage area upon completion of a showing. The embodiments disclosed herein seek to provide a lock box with a sensor capable of detecting the presence of a property access tool within the storage area to confirm that the key and/or access card.

Figure 1:
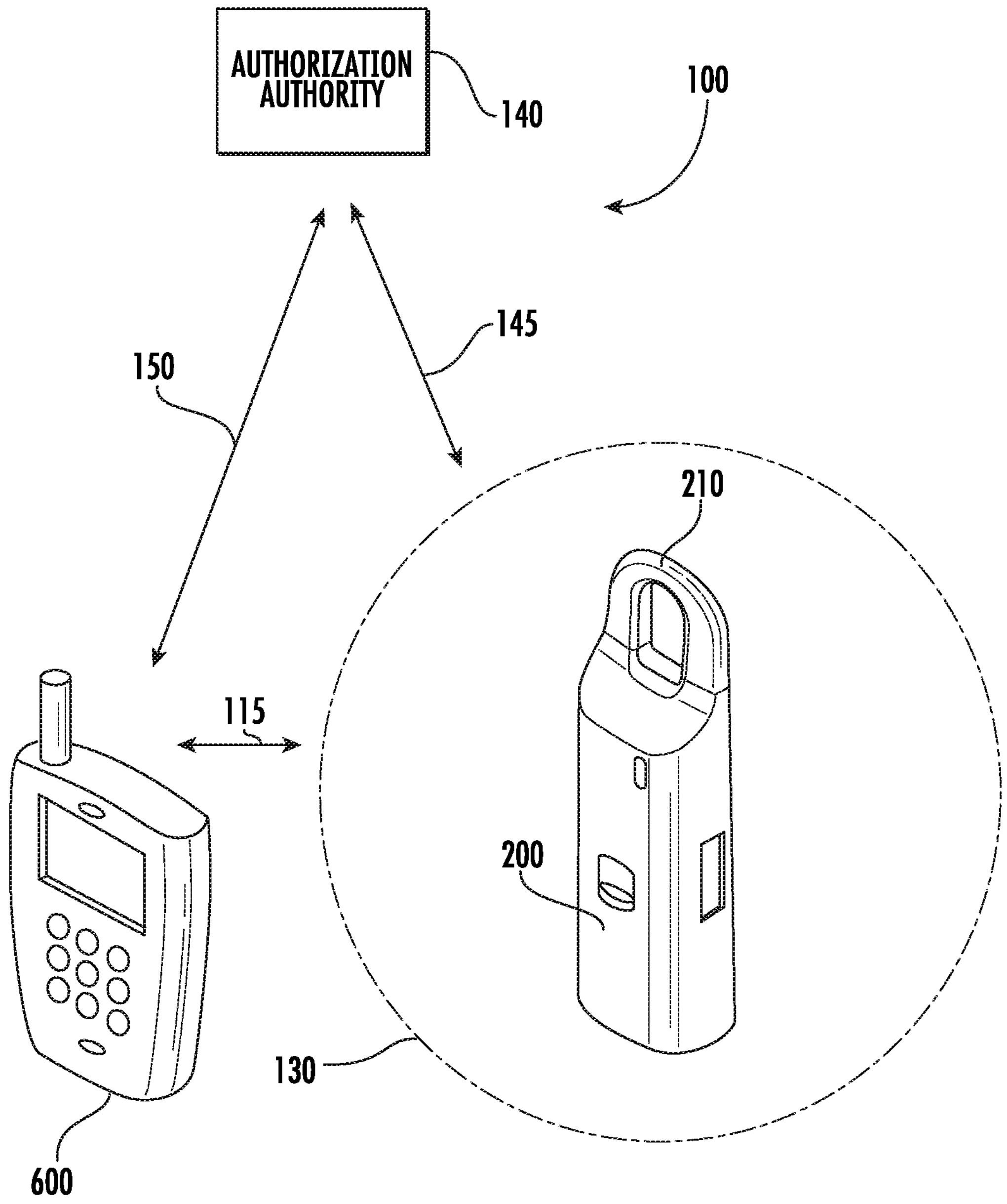
FIG. 1 is a schematic illustration of an exemplary lock box and access device, illustrating a remote authorization entity that may be linked to the lock box and/or the access device, according to an embodiment of the present disclosure.

FIG. 1 is schematic view of a representative restricted range lock box and access key system 100, according to an embodiment of the present disclosure. A lock box 200 with wireless communications capability is shown in relation to an access device, which in this example is a mobile computing device 600. The mobile computing device 600 may be a portable computing device that is typically carried by a person, such as, for example a phone, a smart phone, a PDA, a smart watch, a tablet, a laptop, or any other mobile computing device known to one of skill in the art.

The restricted range of the lock box 200 is shown schematically at 130. Thus, the cellular telephone as shown in FIG. 1 is outside of the lock box's operating range 130, and would need to be moved within the range 130 to communicate with the lock box 200.

Communications between the lock box 200 and the mobile computing device 600 may be two-way, as indicated by the two-way arrow representing a communications link 115. The communications link 115 may be infrared, Bluetooth, Low-Energy Bluetooth, Near Field Communication (NFC), or any other similar communication method known to one of skill in the art. In some cases, one-way communication from the mobile computing device 600 to the lock box 200 may be sufficient.

All of the conventional lock box functions may be supported. For example, the communications from the mobile computing device 600 to the lock box 200 can include the ability for the user of the mobile computing device 600 to make an access request directed to the lock box 200. This access request may include communication of a credential indicating that the user is authorized for access.

In response, the lock box may communicate a message, either via a display on the lock box or via a message transmitted to the mobile computing device 600, denying access. Access may be denied, e.g., if the user is unauthorized, if the user's credentials have expired, or if the access privileges have been superseded (e.g., if the property owner has overridden access privileges or is invoking the call before showing feature).

If access is granted, the lock box 200 allows the user to gain access to a storage area 290 (FIG. 2) in the lock box 200 or open a shackle 210 for removing the lock box 200 from an object to which it is attached (e.g., a door). In specific implementations, the lock box has a circuit that controls a lock mechanism that secures the storage area 290 and shackle 210 in a locked condition when in use. When an access request is granted, the circuit unlocks the lock mechanism to provide the user access to the storage area 290, the shackle, or both. The internal components of the lock box 200 and the storage area 290 are protected from the external environment by an outer cover 202. The outer cover 202 may be composed of a tough durable material to prevent, or at least impede, someone from breaking into the lock box 200 and removing the key or the access card in the storage area 290.

Optionally, the access key system 100 may also include an authorization authority 140, which can be linked to the lock box 200 (via a link 145), or to the mobile computing device 600 (via the link 150) or to both the lock box 200 and the mobile computing device 600. The authorization authority can administer granting credentials to users, collect information on usage and activity and provide for updates to devices (lock boxes and access devices) in the access key system 100.

There are a number of possible ways to implement restricted range wireless communications by which the communicating devices are magnetically coupled. As only one example, the devices can be configured according to the Near Field Communication standards.

NFC is described as a standards based, short range wireless connectivity technology that enables simple and safe two-way interactions among appropriately configured electronic devices. Near Field Communication is based on inductive-coupling, where loosely coupled inductive circuits share power and data over a distance of a few centimeters. NFC devices share some similarities with proximity (13.56 MHz) RFID tags and contactless smartcards, but have a number of new features.

NFC is described as being fast, private, and easy as compared to other wireless standards. The NFC set-up time is less than 0.1 millisecond, which is much less than the Bluetooth set-up time of about 6 seconds and less than the IrDa set-up time of about 0.5 second. The NFC operating range is 10 cm or less, which is shorter and provides for more privacy than RFID (operating range up to 3 meters) and Bluetooth (up to 30 meters). At the same time, NFC is more convenient than IrDa which requires line of sight alignment for communication between devices, whereas NFC requires only that the devices be within the NFC operating range of each other. Thus, NFC is one communications technology ideally suited to implementing a restricted range lock box. In addition, RFID is largely limited to item tracking, and Bluetooth is comparatively more difficult to use because some configuration of the device is required.

NFC operates at 13.56 MHz and transfers data at up to 424 Kbits/second (current data rates are 106 kbps, 212 kbps and 424 kbps). The 13.56 MHz band is not currently regulated, so no license is required. NFC is both a "read" and "write" technology. NFC devices are unique in that they can change their mode of operation to be in reader/writer mode, peer-to-peer mode, or card emulation mode. In reader/writer mode, an NFC device is capable of reading NFC tag types, such as in the scenario of reading an NFC Smartposter tag. The reader/writer mode is on the RF interface compliant with the ISO 14443 and FeliCa schemes. In Peer-to-Peer mode, two NFC devices can exchange data. For example, Bluetooth or Wi-Fi link set up parameters can be shared, and/or data such as virtual business cards or digital photos can be exchanged. Peer-to-Peer mode is standardized on the ISO/IEC 18092 standard. In Card Emulation mode, the NFC device itself acts as an NFC tag (which is a passive device that stores data), appearing to an external reader much the same as a traditional contactless smart card. This enables, for example, contactless payments and eticketing.

Communication between two NFC-compatible devices occurs when they are brought within operating range of each other: a simple wave or touch of a device can establish an NFC connection, which is then compatible with other known wireless technologies such as Bluetooth or Wi-Fi. Because the transmission range is so short, NFC-enabled transactions are inherently secure. Also, the required physical proximity of one device to another is intuitive and gives users the reassurance of being in control of the process.

The underlying layers of NFC technology follow ISO/IEC (International Organization for Standardization/International Electrotechnical Commission, ECMA (European Telecommunications Standards Institute), and ETSI (European Telecommunications Standards Institute) standards. NFC compliant devices in the NFC Reader/Writer mode must support the RF requirements for ISO/IEC 14443A, ISO/IEC 14443 B and FeliCa as outlined in the relevant parts in the ISO 18092. As of this time, there are five published NFC specifications: Smart Poster Record Type Definition (RTD); Data Exchange Format; Record Type Definition; Text RTD and URI RTD. NFC devices are naturally interoperable, as NFC is based on pre-existing contactless payment and ticketing standards that are used on a daily basis by millions of people and devices worldwide. These standards determine not only the "contactless" operating environment, such as the physical requirements of the antennas, but also the format of the data to be transferred and the data rates for that transfer.

Because NFC components are generally smaller, the size of the access device can be kept small, which increases convenience. Also, the size of the lock box can be reduced.

It is understood that embodiments described herein are not limited to the communication link 115 between the lock box 200 and the mobile computing device 600 being NFC, and the embodiment described herein may be applicable to other communications links 115 between the lock box 200 and the mobile computing device 600 including but not limitation to infrared, Bluetooth, Low-Energy Bluetooth, or any other similar communication method known to one of skill in the art.

Figure 2:
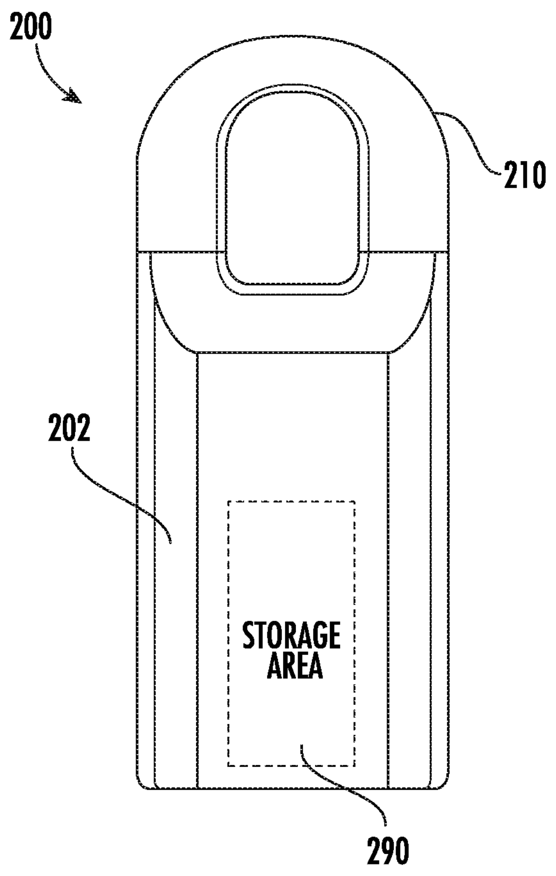
FIG. 2 is a schematic view of an exemplary lock box showing a storage area suitable for holding one or more property access tool (e.g., keys, access cards, or other access aids), according to an embodiment of the present disclosure.
Figure 3:
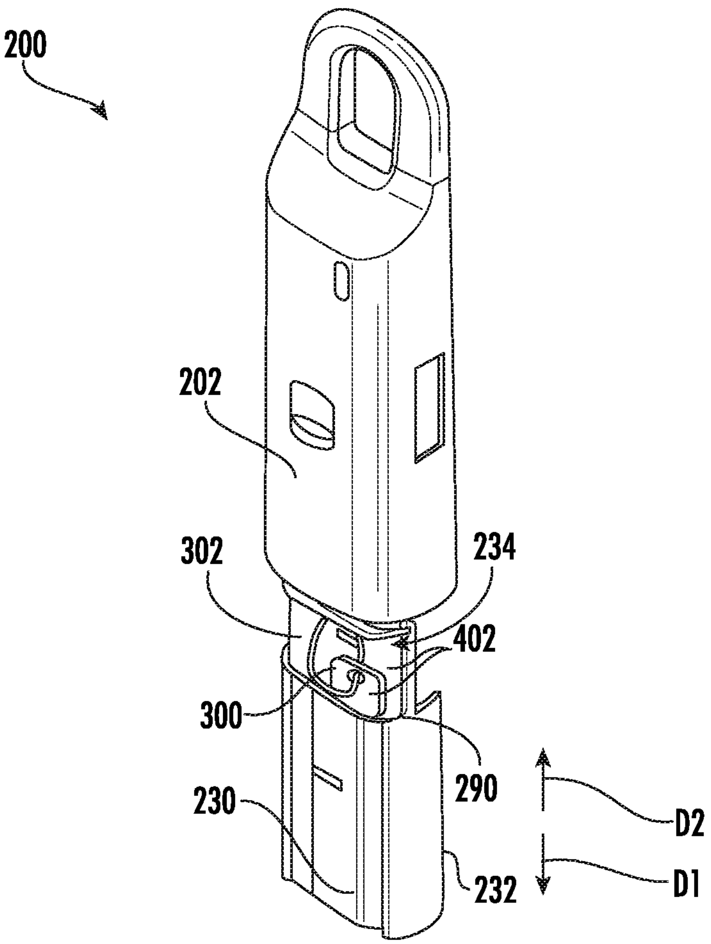
FIG. 3 illustrates an exemplary lock box with a removable lower housing slid away from and out of the outer cover, according to an embodiment of the present disclosure.

Referring now to FIG. 3, with continued reference to FIGS. 1-2, a schematic isometric illustration of a lock box 200 is shown in FIG. 3, according to an embodiment of the present disclosure. FIG. 3 illustrates a removable lower housing 230 being slid away from and out of the outer cover 202 when the lock box 200 is unlocked. The removable lower housing 230 may be separated from the outer cover 202 by moving the removable lower housing 230 in a first direction D1. The first direction D1 may be a gravitationally downward direction. The removable lower housing 230 may first need to be first pushed in a second direction D2 opposite the first direction D1 before being moved in the first direction D1 to be removed from the outer cover 202. The first direction D1 moves the removable lower housing 230 away from the outer cover 202 and second direction D2 moves the removable lower housing 230 into the outer cover 202.

The removable lower housing 230 includes a first housing side 234 and a second housing side 232 located opposite the first housing side 234. The storage area 290 may be located on the first housing side 234. The storage area 290 is configured to fit and retain a property access tool 402. The property access tool 402 may be a key 300 or an access card 302 in certain instances. As illustrated in FIG. 3, the property access tool 402 is retained within the storage area 290 when the removable lower housing 230 is slid away from and out of the outer cover 202. Therefore, the property access tool 402 is easily accessible for a user to remove and replace when the removable lower housing 230 is slid away from and out of the outer cover 202.

Figure 4:
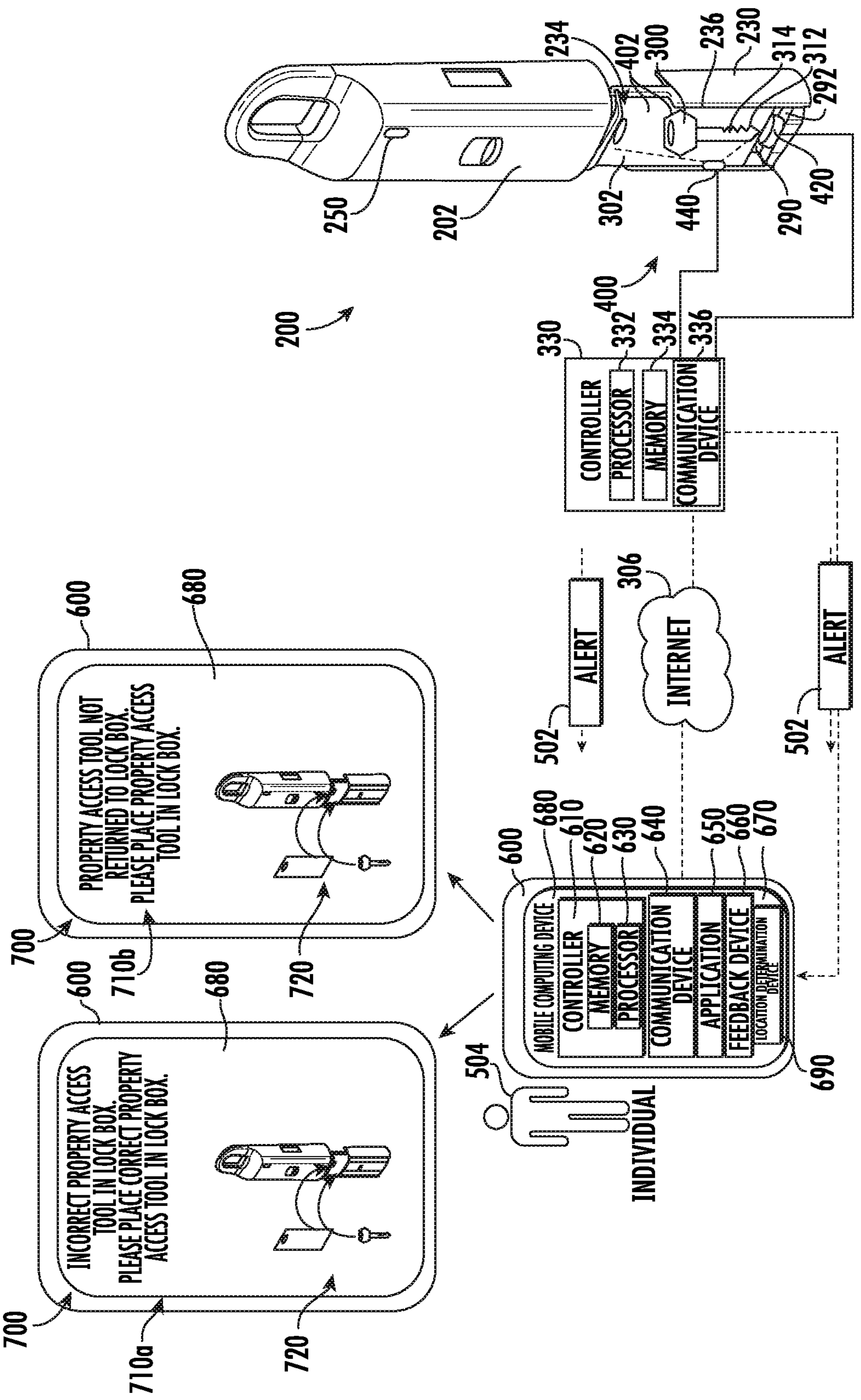
FIG. 4 illustrates a view of an exemplary object detection system for the lock box, according to an embodiment of the present disclosure.

Referring now to FIG. 4, with continued reference to FIGS. 1-2, a schematic illustration of an object detection system 400 for the lock box 200, according to an embodiment of the present disclosure. FIG. 4 illustrates the storage area 290 with a front portion 236 of the first housing side 234 removed such that the key 300 and access card 302 are fully visible within the storage area 290. When installed, this front portion 236 helps enclose the storage area 290.

The lock box 200 includes an object detection system 400 configured to detect a property access tool 402 within the storage area 290. The object detection system 400 may include a load cell sensor 420 and/or an object shape detection sensor 440.

The load cell sensor 420, when present, is configured to detect a weight of the property access tool 402 when the property access tool 402 is located in the storage area 290. The load cell sensor 420 may be located at or on a bottom surface 292 of the storage area 290 and the property access tool 402 may be placed on top of the load cell sensor 420 to determine the weight of the property access tool 402.

In another embodiment, the property access tool 402 may not be placed directly on the load cell sensor 420 but rather on surface that is operably connected to the load cell sensor 420 such that the weight of the property access tool 402 will transfer from the surface to the load cell sensor 420. For example, the load cell sensor 420 may be placed below a bottom surface 292 of the storage area 290 that is movable and the property access tool 402 is placed on top of the bottom surface 292, which transfers the weight of the property access tool 402 to the load cell sensor 420 to determine the weight of the property access tool 402.

In another embodiment, the property access tool 402 may be hung from the load cell sensor 420 or from a component operably connected to the load cell sensor 420 to determine the weight of the property access tool 402.

The object shape detection sensor 440, when present, is configured to detect a shape of the property access tool 402. The object shape detection sensor 440 may be an ultrasonic sensor, an image recognition sensor, a light detection and ranging (LIDAR) sensor, a laser scanning sensor, a 3D scanning sensor, an eye-safe laser beam sensor, or any other type of sensor capable of detecting a shape of an object in the storage area 290, such as, for example, the property access tool 402. The object shape detection sensor 440 may be used in combination with the load cell sensor 420 or on its own. For example, an incorrect key may be placed in the storage area 290 and the load cell sensor 420 may be tricked if the incorrect key has the same weight as a correct key, thus the object shape detection sensor 440 may be used to determine the shape of the key 300 in the storage area 290 to determine if the key is correct (e.g., if the key is capable of operating the lock to the property). The shape of the key 300 may include a number of ridges 312 of the key 300, a shape of each of the ridges 312 of the key 300, a size of each of the ridges 312 of the key 300, a location of each of the ridges 312 of the key 300, a number of notches 314 of the key 300, a shape of each of the notches 314 of the key 300, a size of each of the notches 314 of the key 300, and/or a location of each of the notches 314 of the key 300. The object shape detection sensor 440 may also be configured to determine a shape and a size of an access card 302.

If present, the load cell sensor 420 is in electronic communication with a controller 330 of the lock box 200. If present, the object shape detection sensor 440 is also in electronic communication with the controller 330 of the lock box 200. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, NFC, Ultra-Wideband, Sub-GHz RF Channel, cellular, satellite, or any other wireless signal known to one of skill in the art. The controller 330 is configured to communicate with a computer application 650 of the mobile computing device 600 using the communication device 336. The controller 330 may be configured to communicate with the computer application 650 through the internet 306 and/or directly with the mobile computing device 600 through wireless signals, such as, for example, Bluetooth, NFC, Ultra-Wideband, Zigbee, or any other wireless technology. The communication device 336 may be connected to the internet 306 through a Wi-Fi router or home automation system (not shown). Alternatively, or additionally, the communication device 336 may be configured to communicate directly with the mobile computing device 600, as aforementioned.

The mobile computing device 600 may belong to an individual 504 that is visiting a real-estate property for a showing. The individual 504 may be a potential buyer of the real-estate property or a real-estate agent of the potential buyer. The individual 504 is authorized to actuate the lock box 200 to obtain the property access tool 402 and gain access to the real-estate property for the showing.

The mobile computing device 600 includes a controller 610 configured to control operations of the mobile computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The mobile computing device 600 includes a communication device 640 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the mobile computing device 600 may be connected to the internet 306 through a hardwired connection. The mobile computing device 600 may configured to communicate with the communication device 336 of the lock box 200 through the internet 306 or directly through wireless communication.

The mobile computing device 600 may include a display device 680, such as for example a computer display, an LCD display, an LED display, an OLED display, a touchscreen of a smart phone, tablet, or any other similar display device known to one of the skill in the art. A user operating the mobile computing device 600 is able to view the computer application 650 through the display device 680.

The mobile computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the mobile computing device 600, or any similar input device known to one of skill in the art. The user operating the mobile computing device 600 is able to enter data into the computer application 650 through the input device 670. The input device 670 allows the user operating the mobile computing device 600 to data into the computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen.

The mobile computing device 600 device may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the computer application 650. For example, the feedback device 660 may activate by emitting an audible sound or vibrate the mobile computing device 600 to confirm that the manual input entered via the input device 670 was received via the computer application 650.

The mobile computing device 600 may also include a location determination device 690 that may be configured to determine a location of the mobile computing device 600 using cellular signal triangulation, a global positioning system (GPS), or any location termination method known to one of skill in the art.

When the property access tool 402 is initially placed in the storage area 290 of the lock box 200, the load cell sensor 420 may determine a weight of the property access tool 402 (using the load cell sensor 420). The weight of the property access tool 402 is saved in the memory 334 of the controller 330. Therefore, anytime a follow-on weight of an object is detected in the storage area 290, the follow-on weight may be compared to the weight of the property access tool 402 in the memory 334 to determine if the correct property access tool 402 has been placed in the storage area 290. If the follow-on weight does not match the weight of the property access tool 402 saved in the memory 334, then an alert 502 may be transmitted from the lock box 200 to the mobile computing device 600.

The alert 502 may be transmitted directly to the computer application 650 of the mobile computing device 600 or through the internet 306. The alert 502 may include a sound or vibration from the feedback device 660. The alert 502 may also display a visual notification 700 displayed on the display device 680 of the mobile computing device 600. The visual notification 700 may indicate that an incorrect property access tool has been placed in the storage area 290. The visual notification 700 may include text **710*a* and/or an image 720. For example, the alert 502** may be a short message service (SMS) text message or a voice message.

The alert 502 may also be activated on the lock box 200. The lock box 200 may include a light 250 (e.g., LED light) that may activate with the alert 502 to capture the attention of the individual 504. For example, the light 250 may blink an alternating green and red indication.

The lock box 200 includes a sensor to detect when the removable lower housing 230 is reinserted into the outer cover 202. For example, the sensor may be a solenoid sensor and during dis-engagement, the solenoid sensor is capable of detecting the release of removable lower housing 230. If the removable lower housing 230 is reinserted into the outer cover 202 with no weight is detected in the storage area 290, then the alert 502 is transmitted to the computer application 650 of the mobile computing device 600.

The alert 502 may be transmitted directly to the computer application 650 of the mobile computing device 600 or through the internet 306. The alert 502 may include a sound or vibration from the feedback device 660. The alert 502 may also display a visual notification 700 displayed on the display device 680 of the mobile computing device 600. The visual notification 700 may indicate that the property access tool 402 has not been placed in the storage area 290. The visual notification 700 may include text 710*b* and/or an image 720.

When the property access tool 402 is initially placed in the storage area 290 of the lock box 200, the object shape detection sensor 440 may determine a shape of the property access tool 402. The shape of the property access tool 402 is saved in the memory 334 of the controller 330. Therefore, anytime a follow-on shape of an object is detected in the storage area 290, the follow-on shape may be compared to the shape of the property access tool 402 in the memory 334 to determine if the correct property access tool 402 has been placed in the storage area 290. If the follow-on shape does not match the shape of the property access tool 402 saved in the memory 334, then an alert 502 may be transmitted from the lock box 200 to the mobile computing device 600.

The alert 502 may be transmitted directly to the computer application 650 of the mobile computing device 600 or through the internet 306. The alert 502 may include a sound or vibration from the feedback device 660. The alert 502 may also display a visual notification 700 displayed on the display device 680 of the mobile computing device 600. The visual notification 700 may indicate that an incorrect property access tool has been placed in the storage area 290. The visual notification 700 may include text 710*a* and/or an image 720.

The lock box 200 includes a sensor to detect when the removable lower housing 230 is reinserted into the outer cover 202. If the removable lower housing 230 is reinserted into the outer cover 202 with no shape is detected in the storage area 290, then the alert 502 is transmitted to the computer application 650 of the mobile computing device 600.

The alert 502 may be transmitted directly to the computer application 650 of the mobile computing device 600 or through the internet 306. The alert 502 may include a sound or vibration from the feedback device 660. The alert 502 may also display a visual notification 700 displayed on the display device 680 of the mobile computing device 600. The visual notification 700 may indicate that the property access tool 402 has not been placed in the storage area 290. The visual notification 700 may include text 710*b* and/or an image 720.

Figure 5:
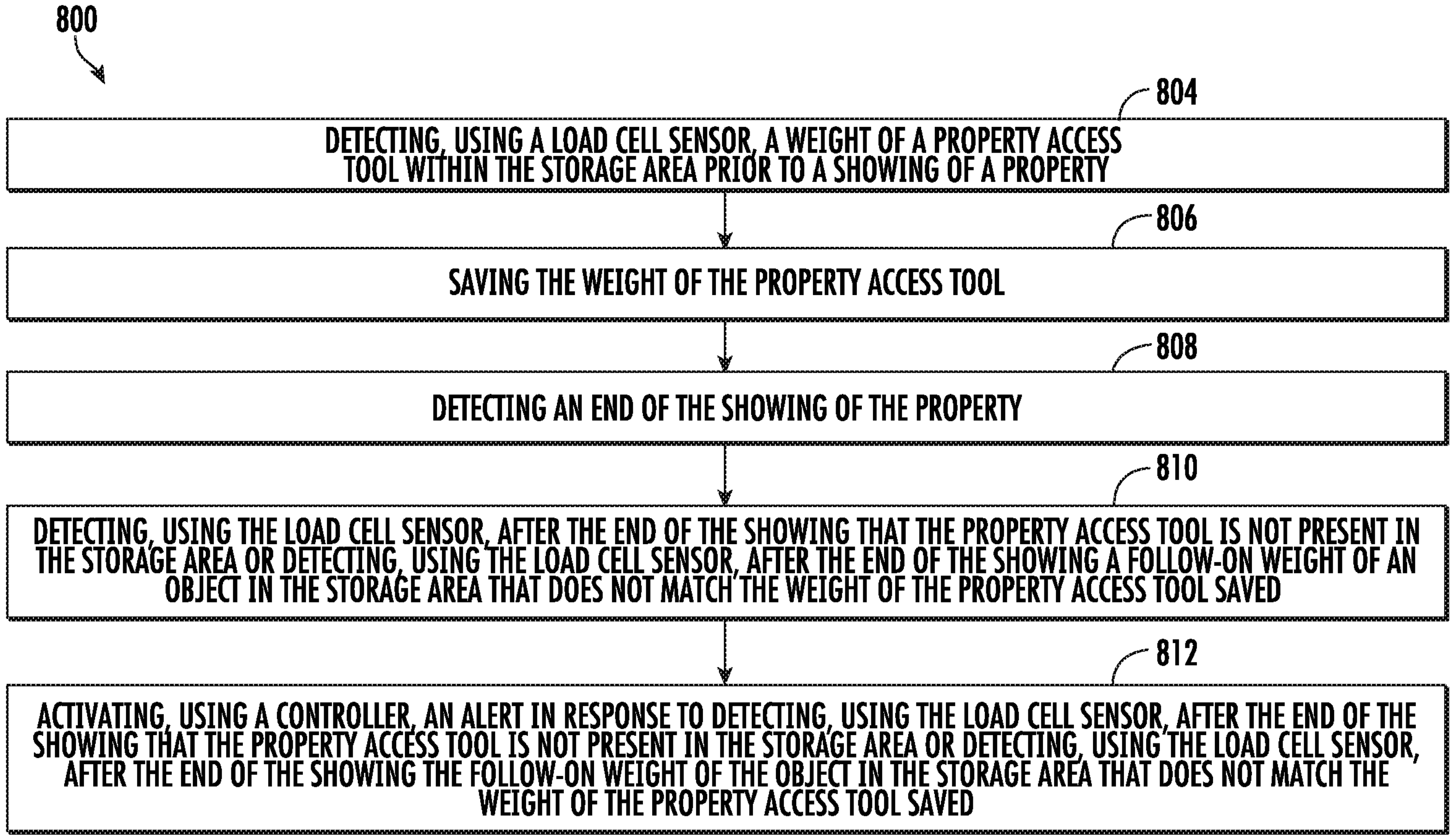
FIG. 5 is a flow process illustrating an exemplary method of monitoring a storage area within a lock box using a load cell sensor, according to an embodiment of the present disclosure.

Referring to FIG. 5, within continued references to FIGS. 1-4, a flow diagram illustrating a method 800 of monitoring a storage area 290 within a lock box 200 is illustrated, in accordance with an embodiment of the present disclosure.

At block 804, a load cell sensor 420 detects a weight of a property access tool 402 within the storage area 290 prior to a showing of a property.

At block 806, the weight of the property access tool 402 is saved. The weight may be saved in the memory 324 of the controller 330 or on a cloud computing network.

At block 808, an end of the showing of the property is detected. The end of the showing may be detected by detecting a closing of the lock box 200, detecting the removable lower housing 230 being reinserted into the outer cover 202, detecting a scheduled time for the showing to end, or detecting when the individual 504 carrying the mobile computing device 600 has moved a selected distance away from the property, which would indicate they have left the property.

At block 810, the load cell sensor 420 detects after the end of the showing that the property access tool 402 is not present in the storage area 290 or after the end of the showing a follow-on weight of an object in the storage area 290 that does not match the weight of the property access tool 402 saved. The object may be a different property access tool 402 or any other weighted mass that was accidently placed in the storage area 290 or intentionally placed in the storage area 290 to trick the lock box 200.

At block 812, a controller 330 of the lock box 200 activates an alert 502 in response to detecting, using the load cell sensor 420, after the end of the showing that the property access tool 402 is not present in the storage area 290 or detecting, using the load cell sensor 420, after the end of the showing the follow-on weight of the object in the storage area 290 that does not match the weight of the property access tool 402 saved.

The method 800 may further include that the controller 330, transmits the alert 502 to a mobile computing device 600. The method 800 may then include that a visual notification 700 is displayed on the mobile computing device 600 indicating that the property access tool 402 has not been placed in the storage area 290. The method 800 may alternatively include that a visual notification 700 is displayed on the mobile computing device 600 indicating that an incorrect property access tool has been placed in the storage area 290.

While the above description has described the flow process of FIG. 5 in a particular order, it should be appreciated that unless otherwise specifically required in the attached claims that the ordering of the steps may be varied.

Figure 6:
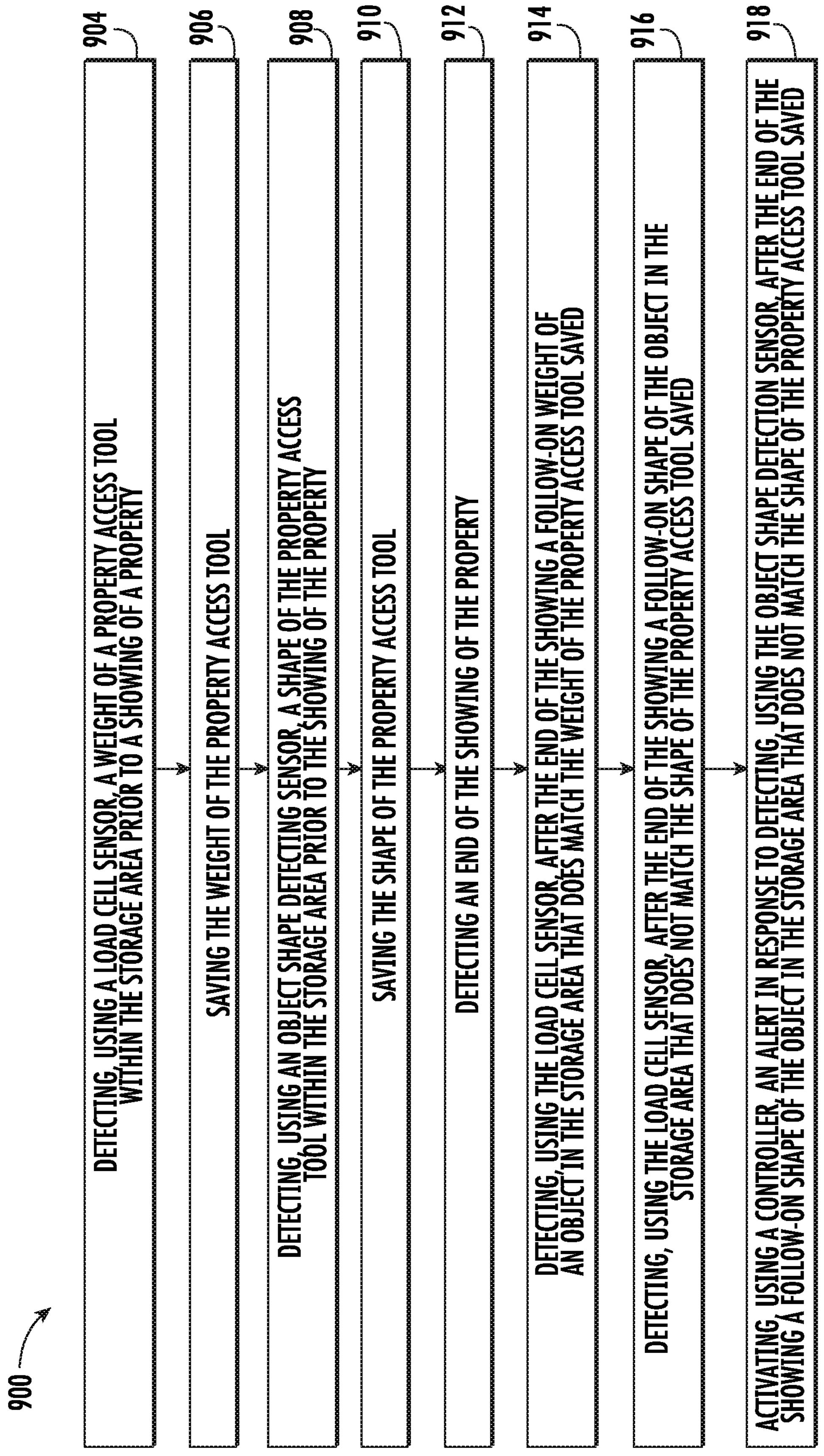
FIG. 6 is a flow process illustrating an exemplary method of monitoring a storage area within a lock box using a load cell sensor and an object shape detection sensor, according to an embodiment of the present disclosure.

Referring to FIG. 6, within continued references to FIGS. 1-4, a flow diagram illustrating a method 900 of monitoring a storage area 290 within a lock box 200 is illustrated, in accordance with an embodiment of the present disclosure.

At block 904, a load cell sensor 420 detects a weight of a property access tool 402 within the storage area 290 prior to a showing of a property.

At block 906, the weight of the property access tool 402 is saved. The weight may be saved in the memory 324 of the controller 330 or on a cloud computing network.

At block 908, an object shape detection sensor 440 detects a shape of the property access tool 402 within the storage area 290 prior to the showing of the property.

At block 910, the shape of the property access tool 402 is saved. The shape may be saved in the memory 324 of the controller 330 or on a cloud computing network.

At block 912, an end of the showing of the property is detected. The end of the showing may be detected by detecting a closing of the lock box 200, detecting the removable lower housing 230 being reinserted into the outer cover 202, detecting a scheduled time for the showing to end, or detecting when the individual 504 carrying the mobile computing device 600 has moved a selected distance away from the property, which would indicate they have left the property.

At block 914, the load cell sensor 420 detects after the end of the showing a follow-on weight of an object in the storage area 290 that does match the weight of the property access tool 402 saved.

At block 916, the object shape detection sensor 440 detects after the end of the showing a follow-on shape of the object in the storage area 290 that does not match the shape of the property access tool 402 saved. The object may be a different property access tool 402 or any other weighted mass that was accidently placed in the storage area 290 or intentionally placed in the storage area 290 to trick the lock box 200.

At block 918, a controller 330 of the lock box 200 activates an alert 502 in response to detecting, using the object shape detection sensor 440, after the end of the showing a follow-on shape of the object in the storage area 290 that does not match the shape of the property access tool 402 saved. A light 250 may also blink on the lock box 200 in response to the alert 502.

The method 900 may further include that the controller 330, transmits the alert 502 to a mobile computing device 600. The method 900 may alternatively include that a visual notification 700 is displayed on the mobile computing device 600 indicating that an incorrect property access tool has been placed in the storage area 290.

While the above description has described the flow process of FIG. 6 in a particular order, it should be appreciated that unless otherwise specifically required in the attached claims that the ordering of the steps may be varied.

Figure 7:
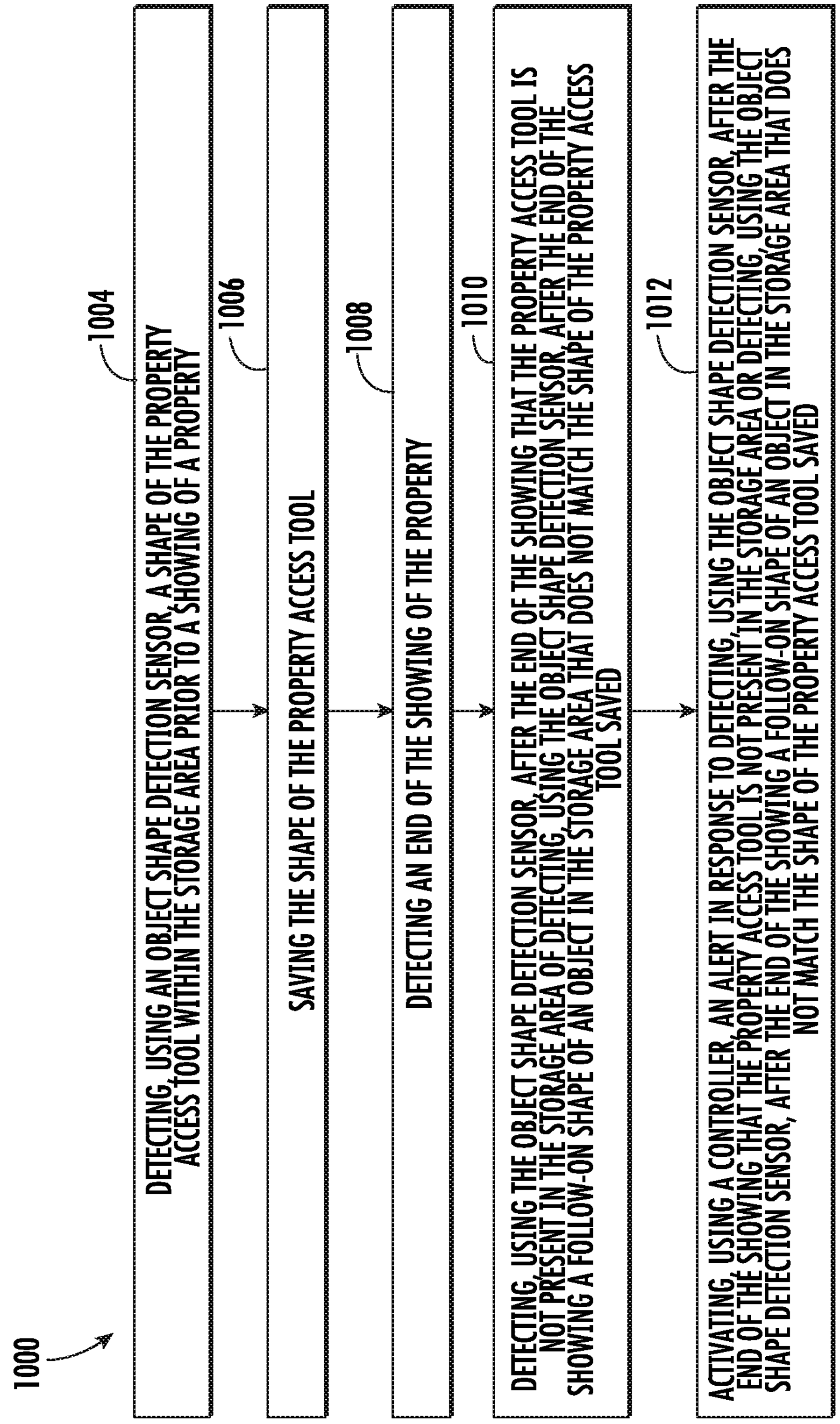
FIG. 7 is a flow process illustrating an exemplary method of monitoring a storage area within a lock box using an object shape detection sensor, according to an embodiment of the present disclosure.

Referring to FIG. 7, within continued references to FIGS. 1-4, a flow diagram illustrating a method 1000 of monitoring a storage area 290 within a lock box 200 is illustrated, in accordance with an embodiment of the present disclosure.

At block 1004, an object shape detection sensor 440 detects a shape of a property access tool 402 within the storage area 290 prior to a showing of a property. The property access tool 402 may be is a key 300 or an access card 302.

At block 1006, the shape of the property access tool 402 is saved. The shape may be saved in the memory 324 of the controller 330 or on a cloud computing network.

At block 1008, an end of the showing of the property is detected. The end of the showing may be detected by detecting a closing of the lock box 200, detecting the removable lower housing 230 being reinserted into the outer cover 202, detecting a scheduled time for the showing to end, or detecting when the individual 504 carrying the mobile computing device 600 has moved a selected distance away from the property, which would indicate they have left the property.

At block 1010, the object shape detection sensor 440 detects after the end of the showing that the property access tool 402 is not present in the storage area 290 or a follow-on shape of an object in the storage area 290 that does not match the shape of the property access tool 402 saved.

At block 1012, a controller 330 of the lock box 200 activates an alert 502 in response to detecting, using the object shape detection sensor 440, after the end of the showing that the property access tool 402 is not present in the storage area 290 or detecting, using the object shape detection sensor 440, after the end of the showing a follow-on shape of an object in the storage area 290 that does not match the shape of the property access tool 402 saved. A light 250 may also blink on the lock box 200 in response to the alert 502.

The method 800 may further include that the controller 330, transmits the alert 502 to a mobile computing device 600. The method 800 may then include that a visual notification 700 is displayed on the mobile computing device 600 indicating that the property access tool 402 has not been placed in the storage area 290. The method 800 may alternatively include that a visual notification 700 is displayed on the mobile computing device 600 indicating that an incorrect property access tool has been placed in the storage area 290.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a storage area within a lock box, the method comprising:

detecting, a weight of a property access tool within the storage area and detecting a shape of the property access tool within the storage area prior to a showing of a property;

saving the weight and the shape of the property access tool;

detecting an end of the showing of the property;

detecting, after the end of the showing, that the property access tool is not present in the storage area by detecting at least one of a weight or a shape of an object present in the storage area; and activating, using a controller, an alert in response to detecting that the property access tool is not present in the storage area.

2. The method of claim 1, wherein the detecting that the property access tool is not present in the storage area is completed by detecting at least one of (i) the weight of the object present in the storage area does not match the saved weight of the property access tool or (ii) the shape of the object present in the storage area does not match the saved shape of the property access tool.

3. The method of claim 1, further comprising:

transmitting, using the controller, the alert to a mobile computing device.

4. The method of claim 3, further comprising:

displaying a visual notification on the mobile computing device indicating that the property access tool has not been placed in the storage area.

5. The method of claim 3, further comprising:

displaying a visual notification on the mobile computing device indicating that an incorrect property access tool has been placed in the storage area.

6. The method of claim 1, wherein the property access tool is either a key or an access card.

7. The method of claim 1, wherein at least one of the weight or the shape of the object present in the storage area does not match the saved weight or shape of the property access tool when the property access tool is not present in the storage area.

8. The method of claim 1, wherein the alert is activated by the controller when the weight of the object present in the storage area does not match the saved weight of the property access tool, but the shape of the object present in the storage area matches the saved shape of the property access tool.

9. The method of claim 1, wherein the alert is activated by the controller when the shape of the object present in the storage area does not match the saved shape of the property access tool, but the weight of the object present in the storage area matches the saved weight of the property access tool.

10. A lock box comprising:

a storage area configured to fit a property access tool therein;

a load cell sensor configured to detect a weight of the property access tool within the storage area and an object shape detection sensor configured to detect a shape of the property access tool within the storage area;

a controller comprising:

a processor; and a memory comprising computer-executable instructions that, when executed by the processor, cause the processor to perform operations, the operations comprising:

detecting the weight of a property access tool within the storage area and detecting the shape of the property access tool within the storage area prior to a showing of a property;

saving the weight and shape of the property access tool;

detecting an end of the showing of the property;

detecting, after the end of the showing, that the property access tool is not present in the storage area by detecting at least one of a weight or a shape of an object present in the storage area; and activating an alert in response to detecting that the property access tool is not present in the storage area.

11. The lock box of claim 10, wherein the detecting that the property access tool is not present in the storage area is completed by detecting at least one of (i) the weight of the object present in the storage area does not match the saved weight of the property access tool or (ii) the shape of the object present in the storage area does not match the saved shape of the property access tool.

12. The lock box of claim 10, wherein the operations further comprise:

transmitting, using the controller, the alert to a mobile computing device.

13. The lock box of claim 12, wherein the operations further comprise:

displaying a visual notification on the mobile computing device indicating that the property access tool has not been placed in the storage area.

14. The lock box of claim 12, wherein the operations further comprise:

displaying a visual notification on the mobile computing device indicating that an incorrect property access tool has been placed in the storage area.

15. The lock box of claim 10, wherein the property access tool is either a key or an access card.

16. The lock box of claim 10, wherein at least one of the weight or the shape of the object present in the storage area does not match the saved weight or shape of the property access tool when the property access tool is not present in the storage area.

17. The lock box of claim 10, wherein the alert is activated by the controller when the weight of the object present in the storage area does not match the saved weight of the property access tool, but the shape of the object present in the storage area matches the saved shape of the property access tool.

18. The lock box of claim 10, wherein the alert is activated by the controller when the shape of the object present in the storage area does not match the saved shape of the property access tool, but the weight of the object present in the storage area matches the saved weight of the property.

19. A method of monitoring a storage area within a lock box, the method comprising:

detecting a shape of a property access tool within the storage area prior to a showing of a property;

saving the shape of the property access tool;

detecting an end of the showing of the property;

detecting, after the end of the showing, that the property access tool is not present in the storage area by detecting a shape of an object present in the storage area; and activating, using a controller, an alert in response to detecting that the property access tool is not present in the storage area.

* * * * *